US007704023B2

(12) United States Patent
Cheung et al.

(10) Patent No.: US 7,704,023 B2
(45) Date of Patent: Apr. 27, 2010

(54) AUTOMATIC DEFLASHING RRIM

(75) Inventors: Patrick Chi-Tak Cheung, Toronto (CA); Paul Arthur Trudeau, St-Bruno (CA)

(73) Assignee: Magna International Inc., Aurora, Ontario (CA)

( * ) Notice: Subject to any disclaimer, the term of this patent is extended or adjusted under 35 U.S.C. 154(b) by 355 days.

(21) Appl. No.: 11/776,072

(22) Filed: Jul. 11, 2007

(65) Prior Publication Data

US 2008/0011142 A1 Jan. 17, 2008

Related U.S. Application Data

(60) Provisional application No. 60/819,926, filed on Jul. 11, 2006.

(51) Int. Cl.
*B23D 5/00* (2006.01)

(52) U.S. Cl. ....................... 409/297; 409/303; 409/296; 409/313; 409/345; 409/140; 409/138; 83/956; 83/914

(58) Field of Classification Search ................. 409/296, 409/297, 298, 300, 301, 303, 313, 348, 138, 409/139, 140, 345; 83/956, 914
See application file for complete search history.

(56) References Cited

U.S. PATENT DOCUMENTS 3,704,188 A * 11/1972 MacDuff ..................... 83/914
4,567,797 A * 2/1986 Folk ............................ 83/956
4,979,411 A * 12/1990 Murasaki et al. .............. 83/956
5,168,787 A * 12/1992 Blaimschein ................ 83/914
5,317,943 A * 6/1994 Dowdle ......................... 83/56
5,931,071 A * 8/1999 Mori ........................... 83/914
6,086,294 A 7/2000 Danchine et al.
6,309,152 B1 * 10/2001 Prosl .......................... 409/138
7,244,083 B1 * 7/2007 Gottschalk et al. .......... 409/232

FOREIGN PATENT DOCUMENTS

CA 2351857 A1 * 11/2002

* cited by examiner

*Primary Examiner*—Erica E Cadugan
(74) *Attorney, Agent, or Firm*—Clark Hill, PLC

(57) ABSTRACT

A cutting tool assembly is provided for removing flash portions and gates from a molded article. The cutting tool assembly includes a holder device including an upper plate, a cylindrical collar, and a bearing disposed between the upper plate and the cylindrical collar to allow movement of the cylindrical collar relative to the upper plate. The cutting tool assembly further includes a cutting member fixedly secured to the cylindrical collar wherein movement of the cylindrical collar relative to the upper plate provides the cutting member with degrees of rotational freedom to float relative to the molded article during trimming of the flash portions and gates.

9 Claims, 7 Drawing Sheets

AUTOMATIC DEFLASHING RRIM

CROSS-REFERENCE

This application claims the benefit of U.S. Provisional Application Ser. No. 60/819,926, filed Jul. 11, 2006 and entitled "Automatic Deflashing RRIM."

BACKGROUND

The invention relates to a cutting tool assembly for deflashing and degating a molded article, and to methods for automatically deflashing and degating a molded article.

Reinforced reaction injection molding (RRIM) and reaction injection molding (RNI) are utilized for manufacturing various molded parts, such as motor vehicle fascias. Parts that are formed via reinforced reaction injection molding include an amount of flash that needs to be removed to improve overall part appearance. The efficient and accurate removal of flash from reinforced reaction injection molded parts is, however, a difficult task. Currently, these reinforced reaction injection molded fascias are deflashed and degated manually using knives and deburring tools. The fascias are then sanded by hand to remove the cutting lines. Such manual deflashing and degating is labor intensive and, as a result, expensive.

SUMMARY

According to one aspect of the invention, a cutting tool assembly is provided for removing flash portions and gates from a molded article. The cutting tool assembly includes a holder device having an upper plate, a cylindrical collar, and a bearing disposed between the upper plate and the cylindrical collar to allow movement of the cylindrical collar relative to the upper plate. The cutting tool assembly also includes a cutting member fixedly secured to the cylindrical collar. The movement of the cylindrical collar relative to the upper plate provides the cutting member with rotational degrees of freedom to float relative to the upper plate during removal of the flash portions and gates from the molded article.

BRIEF DESCRIPTION OF THE DRAWINGS

The embodiments of the invention will be readily appreciated as the same becomes better understood by reference to the following detailed description when considered in connection with the accompanying drawings wherein.

DETAILED DESCRIPTION OF THE EMBODIMENTS

Figure 1:
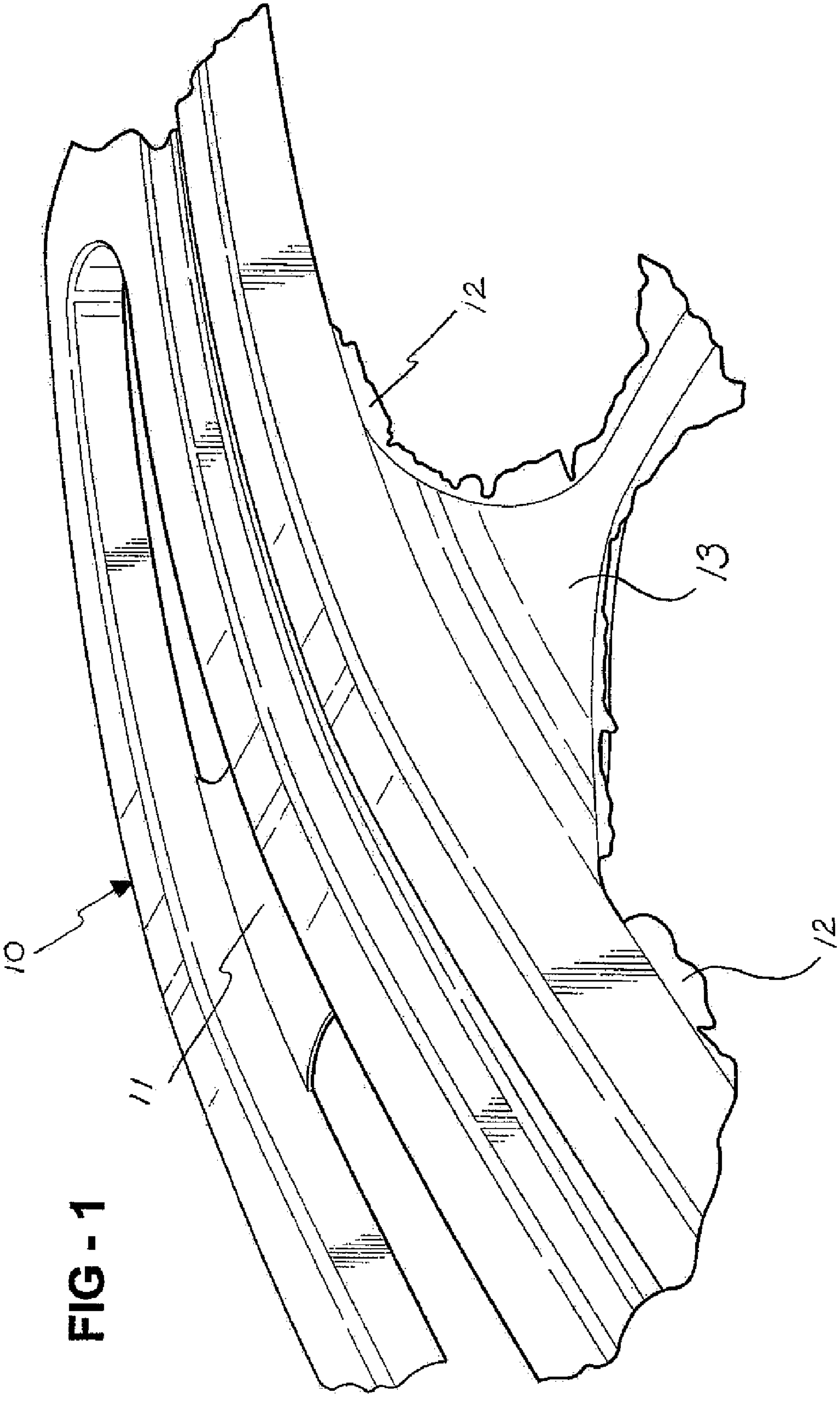
FIG. 1 is a fragmentary, perspective view of a molded article having at least one flash portion and center and outer gates formed during reinforced reaction injection molding.

Referring to FIG. 1, a molded article, generally indicated at 10, is shown after being formed via reinforced reaction injection molding. The molded article 10 includes at least one flash portion 12. The molded article 10 also includes center 11 and outer 13 gates formed during the molding process. Each of the gates 11, 13 is approximately 3.5 mm thick. Each flash portion 12 must be trimmed and each of the gates 11, 13 must be removed to improve the overall appearance of the molded article 10. The molded article 10 in one embodiment is a motor vehicle fascia. It is, however, appreciated that the molded article 10 may be any of a numerous products in a variety of shapes and sizes.

Figure 2:
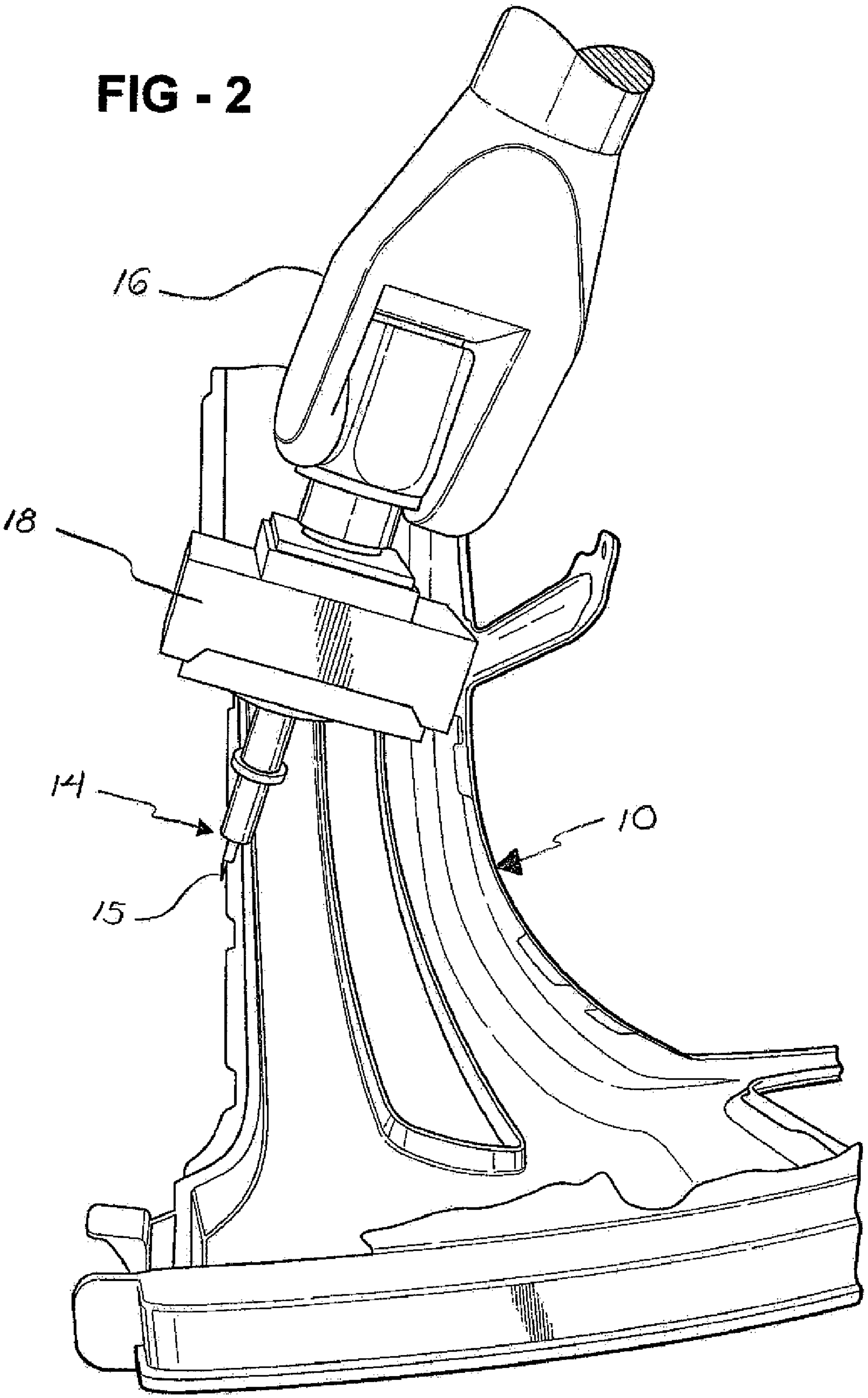
FIG. 2 is a perspective view of a cutting tool assembly secured to a robotic arm for removing the at least one flash portion and gates.

Referring to FIG. 2, a cutting tool assembly, generally shown at 14, includes a cutting member 15 for trimming the flash portion 12 and gates 11, 13 from the fascia 10. The cutting tool assembly 14 is coupled to a robotic arm 16, which moves the cutting member 15 along the fascia 10. A compliance force device 18 is coupled to one end of the robotic arm 16 for controlling and adjusting the force between the cutting tool assembly 14 and the fascia 10. More specifically, the compliance force device 18 includes a controller that constantly monitors the force applied to the fascia 10 and immediately corrects any force variations. As a result, the compliance force device 18 allows the robotic arm 16 to quickly and efficiently move the cutting tool assembly 14 along contoured surfaces of the fascia 10 and around corners thereof Referring to FIGS. 2 and 3, the cutting tool assembly 14 includes a holder device, generally indicated at 20, fixedly secured to the compliance force device 18. The holder device 20 includes an upper plate 22 abutting the compliance force device 18. The upper plate 22 defines outer apertures 24, each receiving a fastener therethrough for attachment to the compliance force device 18, and a central aperture 26. The upper plate 22 may be disc-shaped. It is, however, appreciated that the particular shape of the upper plate 22 may vary.

The holder device 20 also includes a cylindrical collar 28 having a first end 30 abutting the upper plate 22 and an opposing second end 32. A bearing 34 is disposed between the cylindrical collar 28 and the upper plate 22 to allow for floating movement of the cylindrical collar 28 relative to the upper plate 22. A clamp 36 is disposed at the second end 32 of the cylindrical collar 28.

Figure 3:
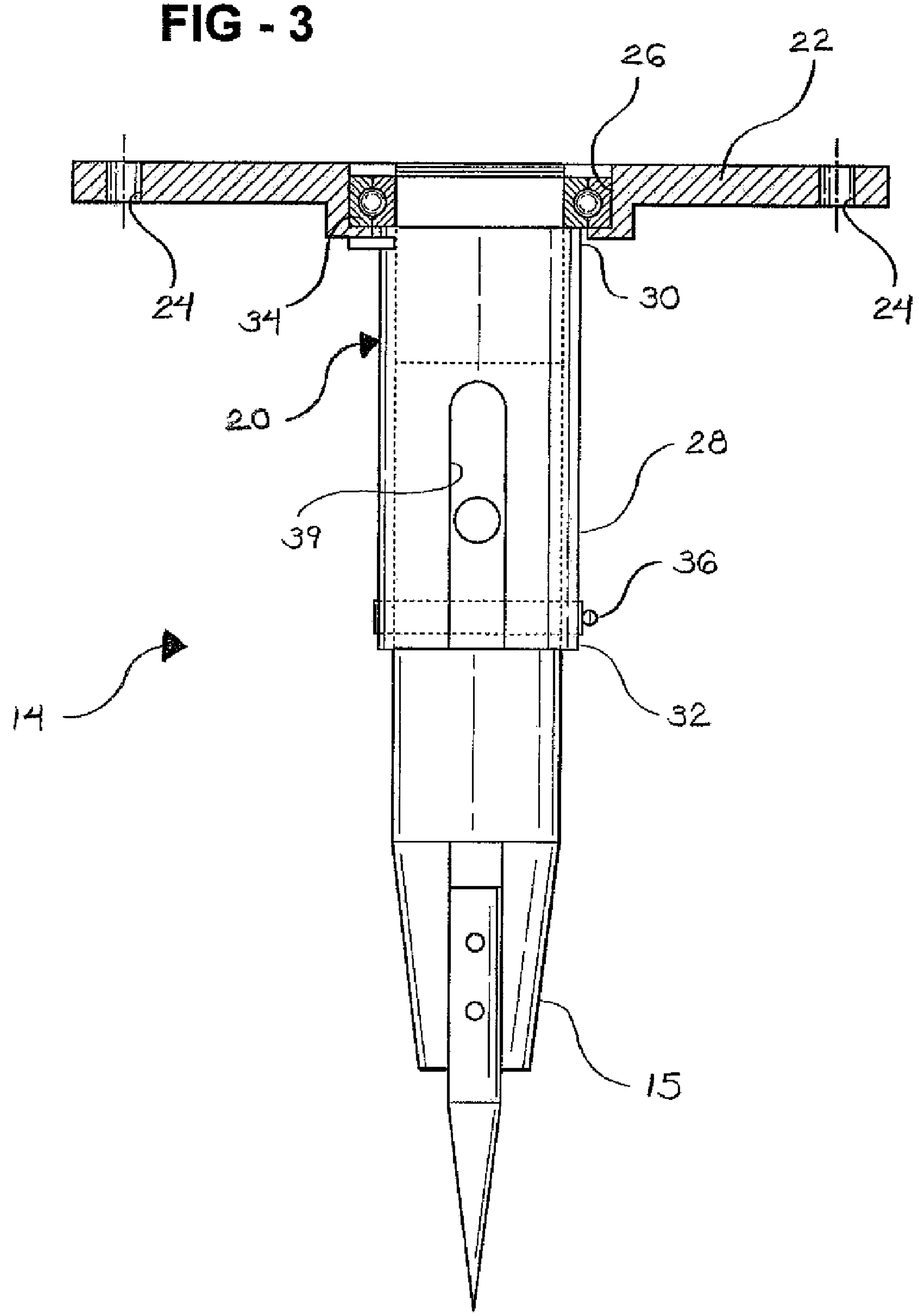
FIG. 3 is a sectional view of the cutting tool assembly including a bearing to allow floating movement of an ultrasonic cutter.

Referring to FIG. 3, the cutting member 15 extends out from the second end 32 of the cylindrical collar 28 and is retained in place by the clamp 36. The cutting member 15 in one embodiment is an ultrasonic cutter, as shown in FIG. 3, with a frequency of up to approximately 40,000 Hz. The height of the ultrasonic cutter 15 may be adjusted via service openings 39 formed in the cylindrical collar 28. Due to the floating attachment between the cylindrical collar 28 and the upper plate 22, the ultrasonic cutter 15 has +/−5 degrees rotational freedom, which allows the ultrasonic cutter 15 to float along the surface of the fascia 10. At the same time, the compliance force device 18 maintains the ultrasonic cutter 15 in contact with the fascia 10. Taken together, these features provide trimming consistency which improves the overall appearance of the fascia 10.

Figure 6:
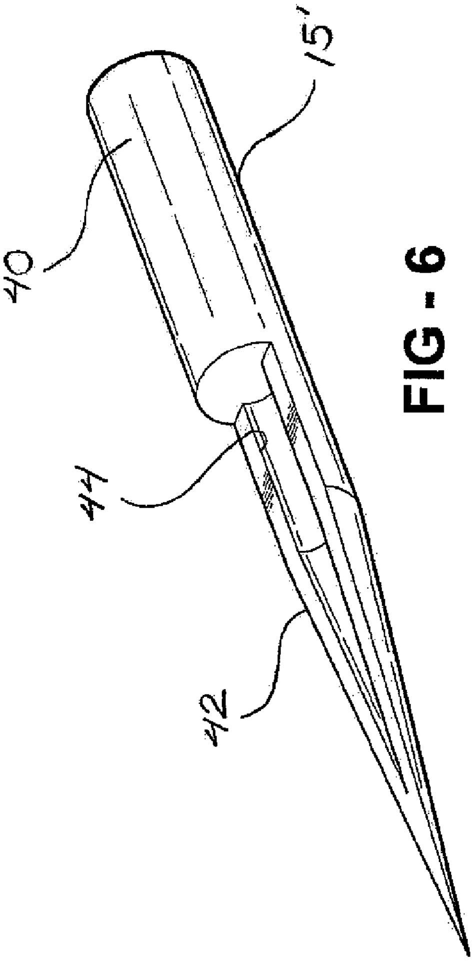
FIG. 6 is a perspective view of the knife including an inner relief
Figure 5:
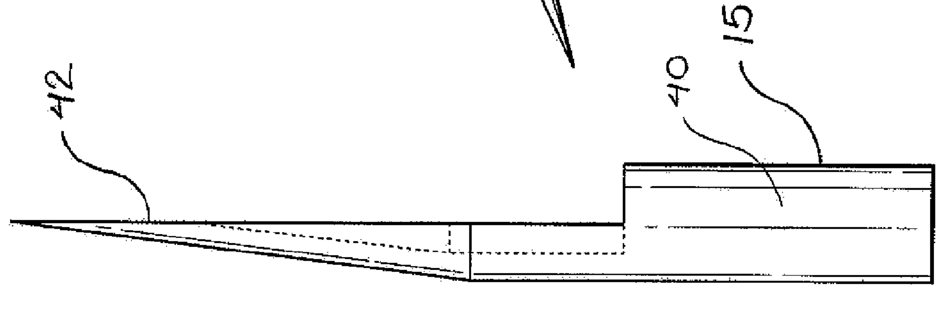
FIG. 5 is a side view of the knife.
Figure 4:
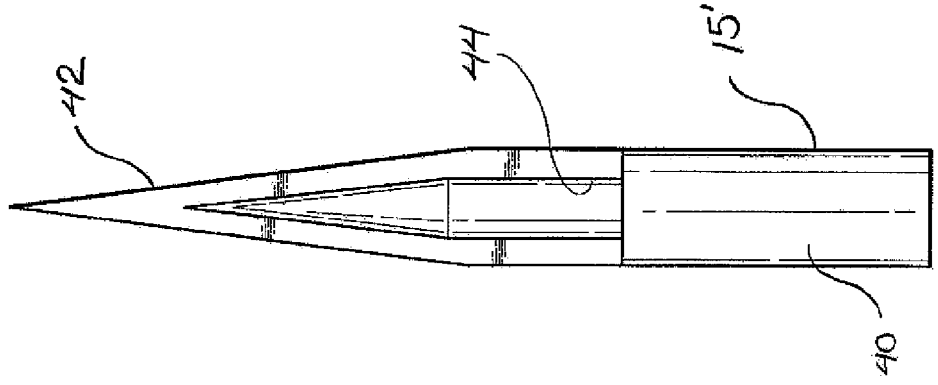
FIG. 4 is a top view of a knife for another embodiment of the cutting tool assembly.

Referring to FIGS. 4 through 6, in another embodiment the cutting member 15' is a knife. The knife 15' includes a body 40 having a blade 42 for trimming the flash portions 12 and gates 11, 13 of the motor vehicle fascia 10. The blade 42 has a flat profile and includes an inner relief 44. The knife 15' may be formed from carbide, high performance steel, or the like. The knife 15' is particularly useful for situations that require hacking through a portion of the fascia 10 that either has a certain thickness (3-4 mm), such as the gates 11, 13, or is formed of different materials.

Figure 7:
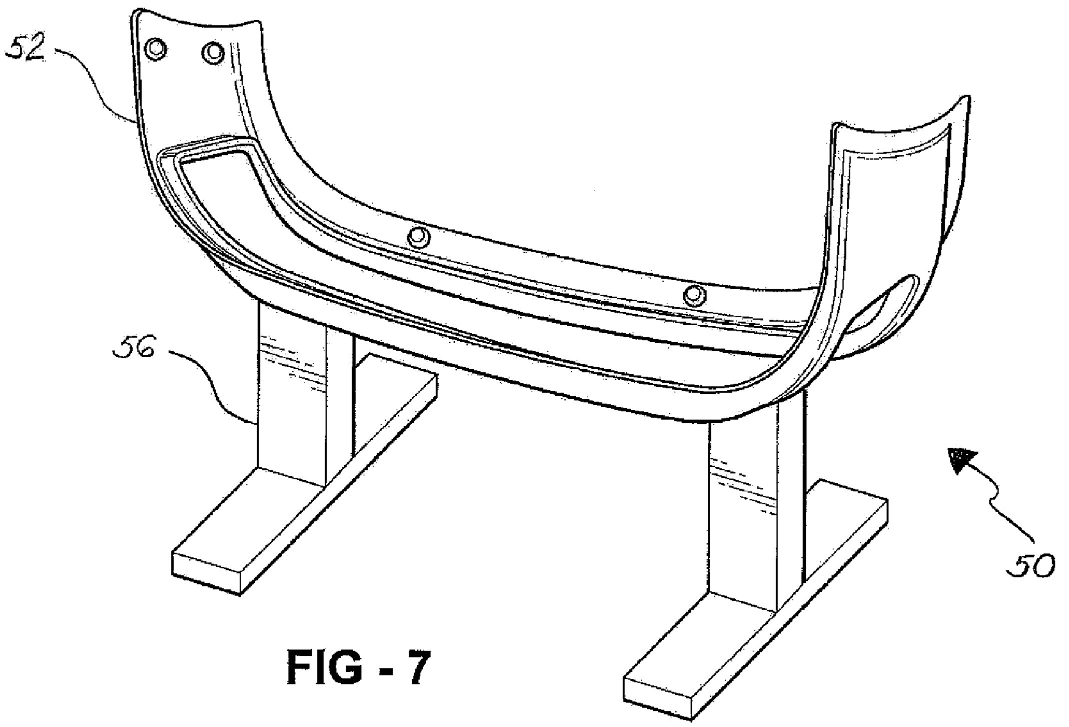
FIG. 7 is a perspective view of a fixture including a female nest for supporting a molded article.
Figure 8:
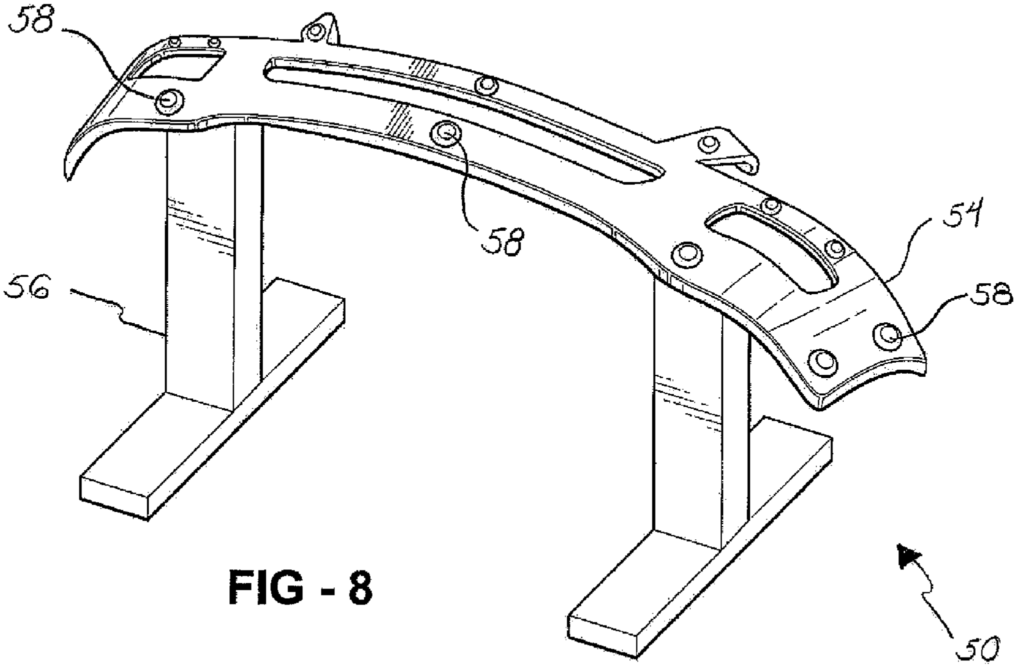
FIG. 8 is a perspective view of a fixture including a male nest for supporting a molded article.

Referring to FIGS. 7 through 10, a fixture, generally shown at 50, is provided for retaining the fascia 10 in place during the trimming of the flash portions 12 and gates 11, 13. The fixture 50 may include a female nest 52, as shown in FIG. 7, or a male nest 54, as shown in FIG. 8. Both the female 52 and male 54 nests are supported by a stand 56. The female nest 52 is generally U-shaped for receiving the fascia 10.

The male nest 54 protrudes outwardly in a direction opposite to the stand 56. The male nest 54 includes at least one suction cup 58 therealong for retaining the fascia 10 firmly in place along the fixture 50. The fixture 50 including the male nest 54 may he angularly adjusted.

The female 52 and male 54 nests accurately fix the fascia 10 in place in a consistent and repeatable manner. At the same time, the compliance force device 18 keeps the cutting device 15, 15' in contact with the fascia 10 even if each successive fascia 10 to be trimmed is not in the exact same position or the fascia 10 moves under the load.

Figure 9:
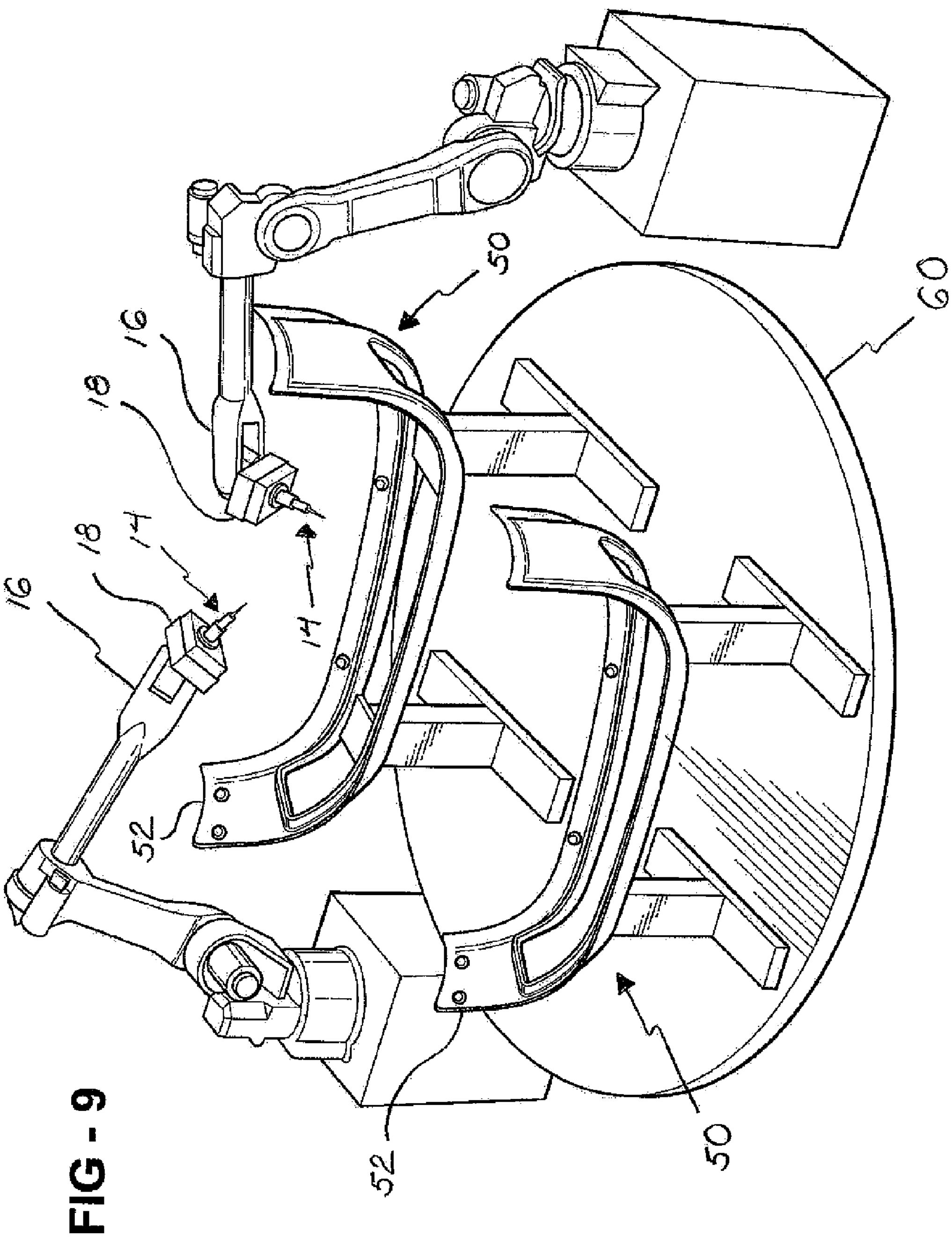
FIG. 9 is a perspective view of a carousel supporting a pair of female nests for use with a pair of cutting tool assemblies.
Figure 10:
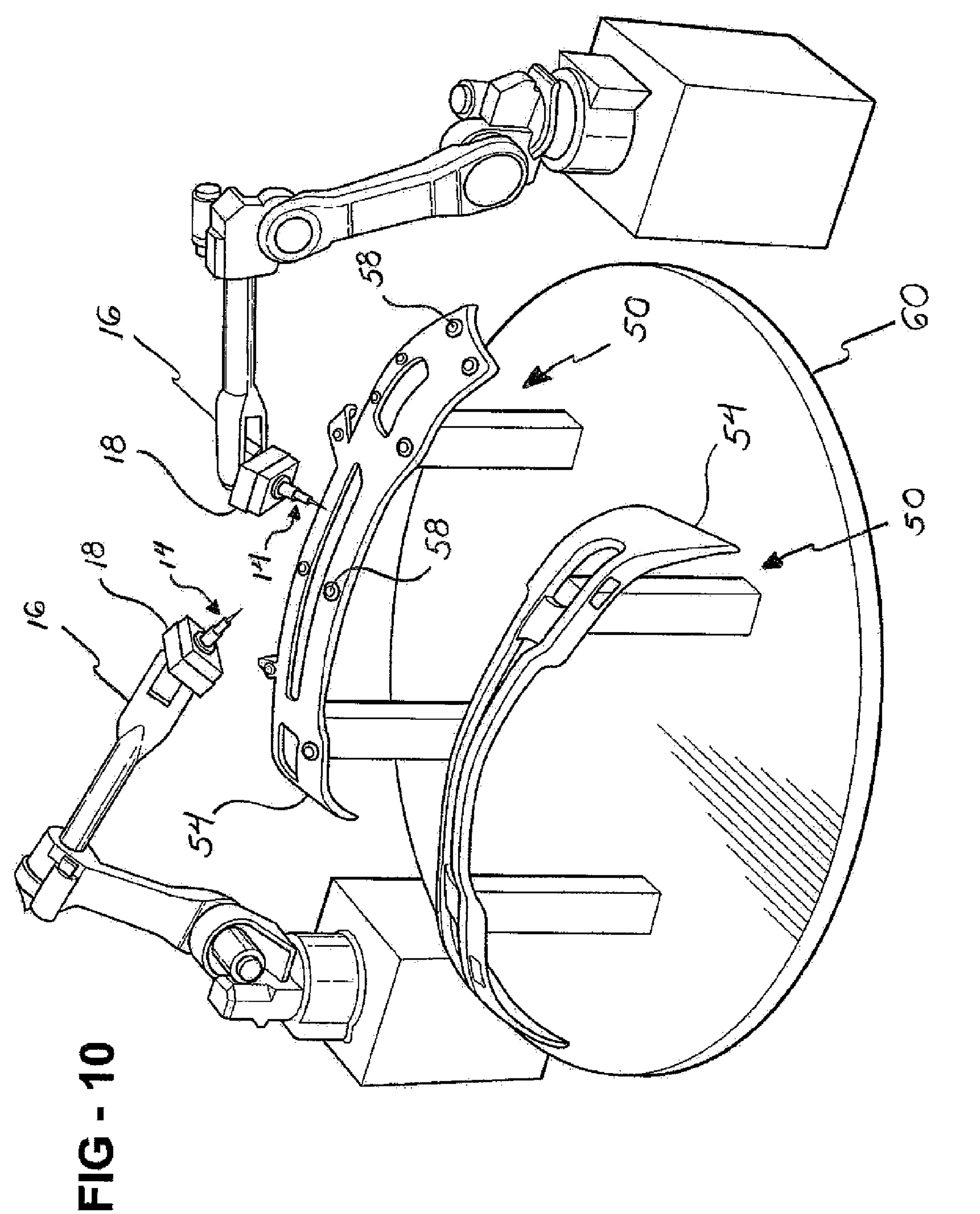
FIG. 10 is a perspective view of a carousel supporting a pair of male nests for use with a pair of cutting tool assemblies.

Referring to FIGS. 9 and 10, an automation process is provided for efficient trimming of flash portions 12 and gates 11, 13 from the fascia 10. A carousel 60 that is movable between at least two positions may be utilized with the pair of robotic arms 16. The pair of the robotic arms 16 is provided for moving the cutting devices 38 to trim the flash portions 12 from each fascia 10. The robotic arms 16 could be hung vertically to increase the envelope. In an alternative embodiment, a third socializing robot (not shown) could be utilized to hold the nest 52, 54 to optimize position and flexibility.

Although the detailed description has referred only to trimming flash from reinforced reaction injection molded articles, it is appreciated that the same may also be applied for trimming flash from molded articles formed by injection molding, blow molding, or the like.

A method of automatically trimming flash portions and gates from a molded article includes the steps of operating the robotic arm 16 to move the cutting tool assembly 18, including the cutting member 15, into contact with the molded article 10. The molded article 10 may be placed on one of the fixtures 50. Once the cutting member 15 is in contact with the molded article, the cutting member 15 is moved along the molded article 10 to trim the flash portions 12 and gates 11, 13 therealong. The amount of force applied by the cutting member 15 to the molded article 10 is controlled by the force compliance device 18 in order to maintain the cutting member 15 in contact with the molded article 10 along varying contours thereof The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed:

1. A cutting tool assembly for removing flash portions and gates from a molded article, said cutting tool assembly comprising a holder device including an upper plate fixedly secured to a force compliance device, a cylindrical collar, and a bearing received in an aperture of the upper plate and disposed between said upper plate and said cylindrical collar to allow movement of said cylindrical collar relative to said upper plate, said cutting tool assembly further including a cutting member fixedly secured to said cylindrical collar, wherein said movement of said cylindrical collar relative to said upper plate provides said cutting member with rotational degrees of freedom to float about a longitudinal axis of the cutting member relative to the molded article during trimming of the flash portions and gates, and wherein the force compliance device is for monitoring the force applied to the molded article by the cutting member and correcting any force variations.

2. A cutting tool assembly as set forth in claim 1 wherein the force compliance device includes a controller that performs the monitoring of the force applied to the molded article by the cutting member and corrects any force variations.

3. A cutting tool assembly as set forth in claim 1 wherein said holder device includes a clamp for fixedly securing said cutting member to said cylindrical collar.

4. A cutting tool assembly as set forth in claim 1 wherein said upper plate is fixedly secured to said force compliance device via fasteners received in apertures in the upper plate.

5. A cutting tool assembly as set forth in claim 1 wherein said cutting member is an ultrasonic cutter.

6. A cutting tool assembly as set forth in claim 5 wherein said ultrasonic cutter has a frequency of up to approximately 40,000 Hz.

7. A cutting tool assembly as set forth in claim 1 wherein said cutting member is a knife.

8. A cutting tool assembly as set forth in claim 7 wherein said knife includes a blade having a flat profile.

9. A cutting tool assembly as set forth in claim 8 wherein said blade includes an inner relief.

* * * * *